United States Patent
Lucey et al.

(10) Patent No.: US 12,293,440 B2
(45) Date of Patent: May 6, 2025

(54) RECOMMENDATION ENGINE FOR COMBINING IMAGES AND GRAPHICS OF SPORTS CONTENT BASED ON ARTIFICIAL INTELLIGENCE GENERATED GAME METRICS

(71) Applicant: STATS LLC, Chicago, IL (US)

(72) Inventors: Patrick Joseph Lucey, Chicago, IL (US); Anthony Borsumato, Cambridge (GB); Kevin Allinson, Yarm (GB); Christian Marko, Graz (AT)

(73) Assignee: STATS LLC, Chicago, IL (US)

( * ) Notice: Subject to any disclaimer, the term of this patent is extended or adjusted under 35 U.S.C. 154(b) by 0 days.

(21) Appl. No.: 18/422,404

(22) Filed: Jan. 25, 2024

(65) Prior Publication Data

US 2024/0161359 A1    May 16, 2024

Related U.S. Application Data

(63) Continuation of application No. 17/937,156, filed on Sep. 30, 2022.

(Continued)

(51) Int. Cl.
*G06T 11/20*    (2006.01)
*G06V 20/40*    (2022.01)

(52) U.S. Cl.
CPC .......... *G06T 11/206* (2013.01); *G06V 20/42* (2022.01); *G06V 20/44* (2022.01)

(58) Field of Classification Search
CPC ....... G06V 20/42; G06V 20/44; G06T 11/206
See application file for complete search history.

(56) References Cited

U.S. PATENT DOCUMENTS 6,616,529 B1    9/2003    Qian et al.
6,710,713 B1    3/2004    Russo
(Continued)

FOREIGN PATENT DOCUMENTS

CN    1386241 A    12/2002
CN    1708697 A    12/2005
(Continued)

OTHER PUBLICATIONS

Abdullah, M.R., et al., "Intelligent Prediction of Soccer Technical Skill on Youth Soccer Player's Relative Performance Using Multivariate Analysis and Artificial Neural Network Techniques," International Journal on Advanced Science, Engineering and Information Technology, vol. 6(5), Dec. 2016, pp. 668-674.

(Continued)

*Primary Examiner* — Phi Hoang
(74) *Attorney, Agent, or Firm* — Bookoff McAndrews, PLLC

(57) ABSTRACT

A computing system receives data for a game. The data includes at least one of tracking data or event data. Based on the data for the game, the computing system determines that an event has occurred within the game. Based on the determining, the computing system generates a graphic responsive to the event. The graphic includes insights related to the event. The computing system recommends an image relevant to the event based on metatags associated with the event. The computing system generates a visual element by merging the image and the graphic.

20 Claims, 5 Drawing Sheets

Related U.S. Application Data

(60) Provisional application No. 63/261,971, filed on Oct. 1, 2021.

(56) References Cited

U.S. PATENT DOCUMENTS

| | | | |
|---|---|---|---|
| 6,751,343 B1 | 6/2004 | Ferrell et al. | |
| 9,342,785 B2 | 5/2016 | Lucey et al. | |
| 9,442,933 B2 | 9/2016 | Tzoukermann et al. | |
| 10,201,752 B2 | 2/2019 | Lucey et al. | |
| 10,460,176 B2 | 10/2019 | Chang et al. | |
| 11,157,742 B2 | 10/2021 | Zhang et al. | |
| 11,182,806 B1 | 11/2021 | Arfa et al. | |
| 11,232,109 B1 | 1/2022 | Knoll et al. | |
| 11,430,030 B1* | 8/2022 | Tagra | G06N 3/045 |
| 11,554,292 B2 | 1/2023 | Ganguly et al. | |
| 11,577,145 B2 | 2/2023 | Ruiz et al. | |
| 11,660,521 B2 | 5/2023 | Ruiz et al. | |
| 2002/0165697 A1 | 11/2002 | Min | |
| 2004/0148275 A1 | 7/2004 | Achlioptas | |
| 2004/0148278 A1 | 7/2004 | Milo et al. | |
| 2005/0143198 A1 | 6/2005 | Charge | |
| 2006/0083304 A1 | 4/2006 | Pan et al. | |
| 2006/0149674 A1 | 7/2006 | Cook et al. | |
| 2006/0252476 A1 | 11/2006 | Bahou | |
| 2007/0293289 A1 | 12/2007 | Loeb | |
| 2008/0281444 A1 | 11/2008 | Krieger et al. | |
| 2009/0186679 A1 | 7/2009 | Irvine et al. | |
| 2009/0203447 A2 | 8/2009 | Hansen et al. | |
| 2010/0129780 A1 | 5/2010 | Homsi et al. | |
| 2010/0184495 A1 | 7/2010 | Levy et al. | |
| 2010/0184563 A1 | 7/2010 | Molyneux et al. | |
| 2010/0283630 A1 | 11/2010 | Alonso | |
| 2010/0298958 A1 | 11/2010 | Connelly | |
| 2011/0013087 A1 | 1/2011 | House et al. | |
| 2011/0169959 A1 | 7/2011 | DeAngelis et al. | |
| 2011/0173235 A1 | 7/2011 | Aman et al. | |
| 2011/0267461 A1 | 11/2011 | Birenboim et al. | |
| 2012/0162435 A1 | 6/2012 | Elangovan et al. | |
| 2012/0214602 A1 | 8/2012 | Ahlstrom | |
| 2013/0104870 A1 | 5/2013 | Rizzo et al. | |
| 2013/0110271 A1 | 5/2013 | Fornell et al. | |
| 2013/0225271 A1 | 8/2013 | Amaitis | |
| 2013/0238106 A1 | 9/2013 | Ellis et al. | |
| 2013/0267328 A1 | 10/2013 | Heisler et al. | |
| 2014/0142921 A1 | 5/2014 | Gleadall et al. | |
| 2014/0143183 A1 | 5/2014 | Sigal et al. | |
| 2014/0206479 A1 | 7/2014 | Marty et al. | |
| 2014/0236331 A1 | 8/2014 | Lehmann et al. | |
| 2014/0274245 A1 | 9/2014 | Stickel | |
| 2014/0302914 A1 | 10/2014 | Weinstein et al. | |
| 2014/0309000 A1 | 10/2014 | Gustafson | |
| 2014/0364976 A1 | 12/2014 | Wohl et al. | |
| 2015/0031845 A1 | 1/2015 | McCauley et al. | |
| 2015/0058730 A1* | 2/2015 | Dubin | G06F 3/0482 715/783 |
| 2015/0131845 A1 | 5/2015 | Forouhar et al. | |
| 2015/0142716 A1 | 5/2015 | Lucey et al. | |
| 2015/0148129 A1 | 5/2015 | Austerlade et al. | |
| 2015/0248917 A1 | 9/2015 | Chang et al. | |
| 2015/0258416 A1 | 9/2015 | Ianni et al. | |
| 2015/0360134 A1 | 12/2015 | Rodriguez | |
| 2016/0007054 A1 | 1/2016 | Polumbus et al. | |
| 2016/0096071 A1 | 4/2016 | Ianni et al. | |
| 2016/0182415 A1 | 6/2016 | Ames et al. | |
| 2016/0203279 A1 | 7/2016 | Srinivas et al. | |
| 2016/0220878 A1 | 8/2016 | Devathi | |
| 2016/0260015 A1 | 9/2016 | Lucey et al. | |
| 2016/0357406 A1* | 12/2016 | Lee | G06V 10/17 |
| 2016/0375365 A1 | 12/2016 | Thompson et al. | |
| 2017/0043260 A1 | 2/2017 | Austerlade et al. | |
| 2017/0061314 A1 | 3/2017 | Schnurr et al. | |
| 2017/0072321 A1 | 3/2017 | Thompson et al. | |
| 2017/0080336 A1 | 3/2017 | Groset et al. | |
| 2017/0109015 A1 | 4/2017 | Krasadakis | |
| 2017/0132821 A1 | 5/2017 | Valliani et al. | |
| 2017/0165570 A1 | 6/2017 | Lucey et al. | |
| 2017/0166557 A1 | 6/2017 | Golden et al. | |
| 2017/0235848 A1 | 8/2017 | Van Dusen et al. | |
| 2017/0238055 A1 | 8/2017 | Chang et al. | |
| 2017/0246539 A1 | 8/2017 | Schwartz et al. | |
| 2017/0255830 A1 | 9/2017 | Chen | |
| 2017/0257653 A1 | 9/2017 | Farré Guiu et al. | |
| 2017/0259178 A1 | 9/2017 | Aghdaie et al. | |
| 2017/0291093 A1 | 10/2017 | Janssen | |
| 2017/0330029 A1 | 11/2017 | Turcot et al. | |
| 2018/0032858 A1 | 2/2018 | Lucey et al. | |
| 2018/0056124 A1 | 3/2018 | Marty et al. | |
| 2018/0084310 A1 | 3/2018 | Katz et al. | |
| 2018/0099201 A1 | 4/2018 | Marty et al. | |
| 2018/0137364 A1 | 5/2018 | Forouhar et al. | |
| 2018/0157974 A1 | 6/2018 | Carr et al. | |
| 2018/0158196 A1 | 6/2018 | Marks | |
| 2018/0204111 A1 | 7/2018 | Zadeh et al. | |
| 2018/0213033 A1 | 7/2018 | Subbian | |
| 2018/0218243 A1 | 8/2018 | Felsen et al. | |
| 2019/0087661 A1 | 3/2019 | Lee et al. | |
| 2019/0205652 A1 | 7/2019 | Ray et al. | |
| 2019/0221072 A1 | 7/2019 | Litman | |
| 2019/0224556 A1 | 7/2019 | Ruiz et al. | |
| 2019/0228306 A1 | 7/2019 | Power et al. | |
| 2019/0251366 A1 | 8/2019 | Zhong et al. | |
| 2019/0374839 A1 | 12/2019 | Wanke et al. | |
| 2020/0004752 A1 | 1/2020 | Majumdar et al. | |
| 2020/0043287 A1 | 2/2020 | Zhang et al. | |
| 2020/0074181 A1 | 3/2020 | Chang et al. | |
| 2020/0170549 A1 | 6/2020 | Baykaner et al. | |
| 2020/0218902 A1 | 7/2020 | Chang et al. | |
| 2020/0230501 A1 | 7/2020 | Schwartz et al. | |
| 2020/0302181 A1 | 9/2020 | Bhanu et al. | |
| 2020/0336802 A1 | 10/2020 | Russell et al. | |
| 2020/0349611 A1 | 11/2020 | Publicover et al. | |
| 2020/0353311 A1 | 11/2020 | Ganguly et al. | |
| 2021/0056458 A1 | 2/2021 | Savova et al. | |
| 2021/0134124 A1 | 5/2021 | Srinivasan | |
| 2021/0142066 A1 | 5/2021 | Jayaram et al. | |
| 2021/0240992 A1* | 8/2021 | Chan | H04N 21/8549 |
| 2021/0256265 A1 | 8/2021 | Gurpinar-Morgan et al. | |
| 2021/0272599 A1 | 9/2021 | Patterson et al. | |
| 2021/0304736 A1 | 9/2021 | Kothari et al. | |
| 2021/0383123 A1 | 12/2021 | Hobbs et al. | |
| 2021/0397846 A1 | 12/2021 | Chang et al. | |
| 2022/0055689 A1 | 2/2022 | Mandlekar et al. | |
| 2022/0067983 A1 | 3/2022 | Fidler et al. | |
| 2022/0253679 A1 | 8/2022 | Power et al. | |
| 2022/0270004 A1 | 8/2022 | Ruiz et al. | |
| 2022/0284311 A1 | 9/2022 | Haynes et al. | |
| 2023/0106936 A1 | 4/2023 | Dinsdale et al. | |

FOREIGN PATENT DOCUMENTS

| | | |
|---|---|---|
| CN | 102819749 A | 12/2012 |
| CN | 105833502 A | 8/2016 |
| KR | 100986647 B1 | 10/2010 |
| WO | 0122270 A2 | 3/2001 |
| WO | 2013166456 A2 | 11/2013 |
| WO | 2014008134 A1 | 1/2014 |
| WO | 2015076682 A1 | 5/2015 |
| WO | 2017031356 A1 | 2/2017 |
| WO | 2017161167 A1 | 9/2017 |
| WO | 2020010040 A1 | 1/2020 |

OTHER PUBLICATIONS

Abreu, P.H., et al., "Improving a Simulated Soccer Team's Performance Through a Memory-based Collaborative Filtering Approach," Applied Soft Computing 23, 2014, pp. 180-193.

Acuna, D., "Unsupervised Modeling of the Movement of Basketball Players Using a Deep Generative Model," 31st Conference on Neural Information Processing Systems, 2017, 11 pages.

Akhter, I., et al., "Bilinear Spatiotemporal Basis Models", ACM Transactions on Graphics, vol. 31, No. 2, Article 17, Apr. 2012, 12 pages.

(56) References Cited

OTHER PUBLICATIONS

Alahi, A., et al., "Social LSTM: Human Trajectory Prediction in Crowded Spaces", Proceedings of the IEEE Conference on Computer Vision and Pattern Recognition, 2016, 11 Pages.
Alcorn, M.A., "(batter|pitcher) 2vec: Statistic-free Talent Modeling with Neural Player Embeddings", MIT Sloan Sports Analytics Conference, 2018.
Al-Shboul, A., et al., "Automated Player Selection for Sports Team using Competitive Neural Networks", International Journal of Advanced Computer Science and Applications (IJACSA), vol. 8, No. 8, 2017, pp. 457-460.
Anderson, C., et al., "The Numbers Game: Why Everything You Know About Soccer is Wrong", 2013, Penguin Books.
Arabzad, S.M., et al., Football Match Results Prediction Using Artificial Neural Networks; the Case of Iran Pro League, Journal Applied Research on Industrial Engineering, vol. 1(3) Oct. 9, 2014, pp. 159-179.
Asif, M and McHale, I.G., "In-Play forecasting of win probability in One-Day International cricket: A dynamic logistic regression model", International Journal of Forecasting 32, 2016, pp. 34-43.
Bengio, Y., et al., "A Neural Probabilistic Language Model", Journal of Machine Learning Research, vol. 3, 2003, pp. 1137-1155.
Beuoy, "Updated NBA Win Probability Calculator", InPredictable, http://www.inpredictable.com/2015/02/updated-nba-win-probability-calculator.html, dated Feb. 6, 2015, 4 pages.
Bialkowski, A., et al., "Large-Scale Analysis of Soccer Matches using Spatiotemporal Tracking Data", IEEE International Conference on Data Mining, 2014, 6 pages.
Bishop, "Mixture Density Networks", Neural Computing Research Group Report, NCRG/94/004, Dated Feb. 1994, 26 Pages.
Blaikie, A.D., et al., "NFL & NCAA Football Prediction using Artificial Neural network," Proceedings of the Midstates Conference for Undergraduate Research in Computer Science and Mathematics, 2011, 8 pages.
Blei, D.M et al., "Latent Dirichlet Allocation", Journal of Machine Learning Research, vol. 3, 2003, pp. 993-1022.
Boice, "How Our Club Soccer Projections Work", Five ThirtyEight, https://fivethirtyeight.com/features/how-our-club-soccer-projections-work/, Dated Jan. 19, 2017, 6 pages.
Boshnakov, G. et al., "A Bivariate Weibull Count Model For Forecasting Association Football Scores", dated Sep. 9, 2016, 13 pages.
Bowman, S.M., et al., "Generating Sentences from a Continuous Space", arXiv preprint arXiv: 1511.06349, May 12, 2016, 12 Pages.
Butt, A.A and Collins, R.T., "Multi-target Tracking by Lagrangian Relaxation to Min-Cost Network Flow", Proceedings of the IEEE Conference on Computer Vision and Pattern Recognition, 2013, 8 pages.
Carney, M., et al., Predicting Probability Distributions for Surf Height Using an Ensemble of Mixture Density Networks, Proceedings of the 22nd International Conference on Machine Learning, 2005, 8 pages.
Casal, C.A., et al., "Analysis of Corner Kick Success in Elite Football", International Journal of Performance Analysis in Sport, 2015, vol. 15, pp. 430-451.
Cervone, D., et al., "A Multiresolution Stochastic Process Model for Predicting Basketball Possession Outcomes," Journal of American Statistical Association 111.514, 2016, pp. 585-599.
Cervone, D., et al., "Pointwise: Predicting Points and Valuing Decisions in Real Time with NBA Optical Tracking Data", 8th Annual MIT Sloan Sports Analytics Conference, Feb. 28-Mar. 1, 2014, 9 pages.
Chandler, G. and Stevens, G., "An Exploratory Study of Minor League Baseball Statistics," Journal of Quantitative Analysis in Sports 2012, 37 pages.
Charles, J., et al., "Personalizing Human Video Pose Estimation", Proceedings of the IEEE Conference on Computer Vision and Pattern Recognition, 2016, 14 Pages.
Chen, J., et al., "Learning Online Smooth Predictors for Realtime Camera Planning using Recurrent Decision Trees", Proceedings of the IEEE Conference on Computer Vision and Pattern Recognition, 2016, 14 pages.
Cheng, H.T et al., "Wide & Deep Learning for Recommender Systems", Proceedings of the 1st Workshop on Deep Learning for Recommender Systems, Sep. 2016.
Chung, J et al., "Hierarchical Multiscale Recurrent Neural Networks", ICLR 2017, arXiv: 1609.01704v7, dated Mar. 9, 2017, 13 pages.
Covington, P., et al., "Deep Neural Networks for Youtube Recommendations", Proceedings of the 10th ACM Conference on Recommender Systems, pp. 191-198, Sep. 2016.
Cox, M., et al., "Least Squares Congealing for Unsupervised Alignment of Images", CVPR, 2008, 8 pages.
Deerwester, S., et al., "Indexing by Latent Semantic Analysis", 1990, 34 pages.
Deng, Z., et al., "Factorized Variational Autoencoders for Modeling Audience Reactions to Movies", Proceedings of the IEEE Conference on Computer Vision and Pattern Recognition, 2017, 10 pages.
Dertat, et al., "Applied Deep Learning-part 4: Convolutional Neural Networks," Towards Data Science 26, https://towardsdatascience.com/applied-deep-learning-part-4-convolutional-neural-networks-584bc134c1e2, Nov. 8, 2017, 26 pages.
Dinsdale, et al., "Interactive Gaming in Sports," U.S. Appl. No. 17/934,756, filed Sep. 23, 2022, 39 pages.
Dixon, et al., "Modelling Association Football Scores and Inefficiencies in the Football Betting Market", Applied Statistics, vol. 46(2), Published 1997, pp. 265-280.
Dubow, "San Antonio Spurs' Kawhi Leonard ruled out for Game 2 vs. Golden State Warriors", http://www.nba.com/article/2017/05/15/san-antonio-spurs-kawhi-leonard-out-game-2, dated May 15, 2017, 4 pages.
Edge AI and Vision Alliance, "Using Convolutional Neural Networks for Image Recognition," https://www.edge-ai-vision.com/2015/11/using-convolutional-neural-networks-for-image-recognition/, Nov. 12, 2015, 20 pages.
ESPN Staff, "Neymar from Barca to PSG for €222m: Timeline of the world's biggest transfer", ESPN, http://www.espn.com/soccer/blog/soccer-transfers/613/post/3170513/neymar-from-barcelona-to-psg-for-222m-euros-timeline-as-worlds-biggest-transfer-nears, Aug. 4, 2017, 18 pages.
Examination Report No. 1 for Australian Patent Application No. 2022201634 dated Mar. 7, 2023, 4 Pages.
Extended European Search Report for Application No. 20801519.8, dated May 19, 2023, 7 pages.
Extended European Search Report for European Application No. 16876628.5, mailed Jan. 29, 2020, 17 Pages.
Extended European Search Report for European Application No. 19740811.5, mailed Sep. 21, 2021, 10 Pages.
Extended European Search Report for European Application No. 19741311.5, mailed Sep. 15, 2021, 09 Pages.
Extended European Search Report for European Application No. 19741603.5, mailed Jun. 2, 2022, 11 Pages.
Extended European Search Report for European Application No. 19741793.4, mailed Jun. 28, 2022, 10 Pages.
Extended European Search Report for European Application No. 20765556.4, mailed Oct. 7, 2022, 12 Pages.
Far-El, M., "CD160 isoforms and regulation of CD4 and CD8 T-cell responses,"Journal of translational medicine, Sep. 2, 2014, vol. 12:217, pp. 16.
Felsen, et al., "Body shots: Analyzing shooting styles in the NBA using body pose", MIT Sloan, Sports Analytics Conference, Mar. 2017, 11 Pages.
Felsen, P., et al., "What will Happen Next? Forecasting Player Moves in Sports Videos", Proceedings of the IEEE International Conference on Computer Vision, 2017, 10 pages.
Wang, et al., "Classifying NBA offensive plays using neural networks," Proceedings of MIT Sloan Sports Analytics vol. 4, 2016, 9 pages.
Wang, S and Fowlkes, C.C., "Learning Optimal Parameters For Multi-target Tracking", International Journal of Computer Vision 122(3), 2017, 17 pages.

(56) References Cited

OTHER PUBLICATIONS

Wei X., et al., "Large-Scale Analysis of Formations in Soccer," Proceedings of the Digital Image Computing: Techniques and Applications (DICTA), IEEE, Nov. 26, 2013, pp. 1-8, XP032536466, Doi: 10.1109/DICTA.2013.6691503.
Wei, X., et al., "Predicting Serves in Tennis Using Style Priors," Proceedings of the 21st ACM SIGKDD International Conference on Knowledge Discovery and Data Mining, 2015, 9 pages.
Wei, X et al., The Thin Edge of the Wedge: Accurately Predicting Shot Outcomes in Tennis Using Style and Context Priors,Proceedings of the 10th Annual MIT Sloan Sport Anal Conference, Mar. 2016.
Wei, X., "Modelling and Predicting Adversarial Behaviors using Large Amounts of Spatiotemporal Data," Queensland University of Technology, 2016, 164 pages.
Wright, "Liverpool's set-piece problem exposed in 3-3 draw with Watford", https://www.skysports.com/football/news/15117/10985307/liverpools-set-piece-problem-exposed-in-3-3-draw-with-watford, Dec. 8, 2017, 9 pages.
Yamaguchi, K., et al., "Who are you with and Where are you going?", CVPR 2011. IEEE, 2011, 8 pages.
Yue, Y., et al., "Learning Fine-Grained Spatial Models for Dynamic Sports Play Prediction", ICDM, 2014, 10 pages.
Zhao, "Research and Application of Online Learning of Formation Strategy Based on Neural Network Information Collection of China Masters' Dissertations Full Text Database," No. 2, 2014, pp. 38-40.
Zhao, Y., et al., "Applying Deep Bidirectional LSTM and Mixture Density Network for Basketball Trajectory Prediction," OPTIK, 2018, pp. 266-272.
Zheng, S., et al., "Generating Long-term Trajectories Using Deep Hierarchical Networks", Advances in Neural Information Processing Systems, 2016, 9 pages.
Le, H.M., et al., "Data-Driven Ghosting using Deep Imitation Learning", MIT Sloan Sports Analytics Conference, Mar. 3-4, 2017, 15 pages.
Learned-Miller E.G., "DataDriven Image Models through Continuous Joint Alignment," IEEE Transactions on Pattern Analysis and Machine Intelligence, Feb. 2006, vol. 28, No. 2, pp. 236-250.
Lee, N., et al., "Desire: Distant Future Prediction in Dynamic Scenes with Interacting Agents", Proceedings of the IEEE Conference on Computer Vision and Pattern Recognition, 2017, 10 pages.
Liang, X., et al., "Dual Motion Gan for Future-flow Embedded Video Prediction," Proceedings of the IEEE International Conference on Computer Vision, 2017, 9 pages.
Lock, D and Nettleton D., "Using Random Forests to Estimate Win Probability Before Each Play of an NFL Game", JQAS 2014; 10(2);2014, pp. 197-205.
Lucey, P., et al., "Quality vs Quantity: Improved Shot Prediction in Soccer using Strategic Features from Spatiotemporal Data," 9th Annual MIT Sloan Sports Analytics Conference, Feb. 2015, 9 pages.
Lucey, P., et al., "Representing and Discovering Adversarial Team Behaviors using Player Roles", Proceedings of the IEEE Conference on Computer Vision and Pattern Recognition, 2013, 8 pages.
Maaten, LVD.,et al., "Visualizing Data Using t-SNE", Journal of Machine Learning Research Sep. 2008, pp. 2579-2605, Nov. 2008.
Machine Learning Notebook, "Convolutional Neural Networks—Basics," https://mlnotebook.github.io/post/CNN1/, Apr. 7, 2017, 13 pages.
Maher, "Modelling Association Football Scores", Statistica Neerlandica, vol. 36(3), Sep. 1982, pp. 109-118.
Maksai, A., et al., "What Players do with the Ball: A Physically Constrained Interaction Modeling", Proceedings of the IEEE Conference on Computer Vision and Pattern Recognition, 2016, 10 pages.
McCabe, A and Trevathan, J., "Artificial Intelligence in Sports Prediction," Fifth International Conference on Information Technology: New Generations, IEEE Computer Society, Apr. 9, 2008, 4 pages.
Mehrotra, "Elements of Artificial Neural Networks," MIT Press, 1997.
Merhej, C., et al., "What Happened Next? Using Deep Learning to Value Defensive Actions in Football Event-Data," KDD, Aug. 2021, pp. 3394-3403.
Mikolov, T., et al., "Distributed Representations of Words and Phrases and their Compositionality", 2013, 9 Pages.
Mikolov, T., et al., "Efficient Estimation of Word Representations in Vector Space", arXiv:1301.3781v3, dated Sep. 7, 2013, 12 pages.
Miller, A., et al., "Factorized Point Process Intensities: A Spatial Analysis of Professional Basketball", ICML, Jan. 8, 2014, 13 pages.
Nakashima, T., et al., "Off-line Learning of Soccer Formations from Game Logs," 2010 World Automation Congress, 2010, 6 Pages.
Newton, "How Youtub Perfected The Feed", The Verge, https://www.theverge.com/2017/8/30/16222850/youtube-google-brain-algorithm-video-recommendation-personalized-feed, Aug. 30, 2017.
Nikolova, M.H, et al., "The CD160+ CD8high cytotoxic T cell subset correlates with response to HAART in HIV-1+ patients," Cell Immunol . Oct. 2005 , vol. 237(2), pp. 96-105.
Office Action for European Patent Application No. 20801519.8, mailed Jun. 6, 2023, 1 page.
Paine, "The Pats' Comeback Was Incredible—Even If You Think The Falcons Blew It", Five ThirtyEight, https://fivethirtyeight.com/features/patriots-falcons-comeback-super-bowl/, Dated Feb. 6, 2017, 4 pages.
Partial Supplementary European Search Report for European Application No. 16876628.5, mailed Aug. 14, 2019, 16 Pages.
Pathak, D., et al., "Context Encoders: Feature Learning by Inpainting", Proceedings of the IEEE Conference on Computer Vision and Pattern Recognition, 2016, 12 Pages.
Pelechrinis, K., "iWinRNFL: A Simple, Interpretable & Well-Calibrated In-Game Win Probability Model for NFL", arXiv:1704.00197v3, dated Mar. 14, 2018, 7 pages.
Peng, A., et al., "RASL: Robust Alignment by Sparse and Low-Rank Decomposition for Linearly Correlated Images," in IEEE Transactions on Pattern Analysis and Machine Intelligence, vol. 34, No. 11, pp. 2233-2246, Nov. 2012, doi: 10.1109/TPAMI.2011.282.
Perricone, J., et al., "Predicting Results for Professional Basketball Using NBA API Data," 2016, 6 pages.
Pettersson, D and Nyquist, R., "Football Match Prediction Using Deep Learning," Department of Electrical Engineering, Chalmers University of Technology, 2017, 72 pages.
Pourmehr, S and Dadkhah, C., "An Overview on Opponent Modeling in RoboCup Soccer Simulation D," Springer, 2011, 12 pages.
Power, P., et al., "Not All Passes Are Created Equal: Objectively Measuring the Risk and Reward of Passes in Soccer from Tracking Data," Proceedings of the 23rd ACM SIGKDD International Conference on Knowledge Discovery and Data Mining, Aug. 2017, pp. 1605-1613.
Preferred Networks, Inc., "Football Analytics using Deep Learning," YouTube, https://www.youtube.com/watch?v=hs_v3dv6OUI, Jul. 25, 2019, 3 pages.
Pulling, C., "Long Corner Kicks In The English Premier League: Deliveries Into The Goal Ara and Critical Area", International Journal of Fundamental and Applied Kinesiology, vol. 47(2), 2015, pp. 193-201.
Ross, L and Anderson, C.A., "Shortcomings in the Attribution Process: on the Origins and Maintenance of Erroneous Social Assessments," Cambridge University Press, 1982, pp. 129-152.
Ruiz, H., et al., "The Leicester City Fairytale?" Utilizing New Soccer Analytics Tools to Compare Performance in the 15/16 & 16/17 EPL Seasons, Proceedings of the 23rd ACM SIGKDD International Conference on Knowledge Discovery and Data Mining, 2017, 13 pages.
Schechtman-Rock, "Introducing NFLWin: An Open Source Implementation of NFL Win Probability", PhD Football, http://phdfootball.blogspot.com/2016/09/introducing-nflwin-open-source.html, Dated Sep. 1, 2016, 4 pages.
Seidl, T., et al., "Bhostgusters: Realtime Interactive Play Sketching with Synthesized NBA defenses", Proceeding of the 12th MIT Sloan Sports Analytics Conference, 2018, 14 Pages.
Sha, L., et al., "Chalkboarding: A New Spatiotemporal Query Paradigm for Sports Play Retrieval", IUI, 2016, 12 pages.

(56) References Cited

OTHER PUBLICATIONS

Sha, L., et al., "Fine-Grained Retrieval of Sports Plays using Tree-Based Alignment of Trajectories", arXiv preprint arXiv:1710.02255, Oct. 6, 2017, 10 pages.

Sohn, K et al., "Learning Structured Output Representation using Deep Conditional Generative Models", Advances in Neural Information Processing Systems, 2015, 9 pages.

Srinivas, S., et al., "A Taxonomy of Deep Convolutional Neural Nets for Computer Vision," Frontiers in Robotics and AI 2, 2016, 18 Pages.

Stein, M et al. "Bring it to the pitch: Combining video and movement data to enhance team sport analysis," IEEE Transactions on Visualization and Computer Graphics, vol. 24(1), 2018, pp. 13-22.

Su, S., et al., "Social Behavior Prediction from First Person Videos", arXiv preprint arXiv:1611.09464, Nov. 29, 2016, 10 Pages.

Tian, et al., "Use of Machine Learning to Automate the Identification of Basketball Strategies Using Whole Team Player Tracking Data," Applied Sciences, vol. 10(1), Dec. 18, 2019, 17 pages.

Trainor, C., "Goalkeepers: How Repeatable Are Shot Saving Performances?", STATSBOMB, https://statsbomb.com/2014/10/goalkeepers-how-repeatable-are-shot-saving-performances/, Oct. 21, 2014.

Van Den Oord, A., et al., "Pixel Recurrent Neural Networks", arXiv preprint arXiv: 1601.06759, Aug. 19, 2016, 11 pages.

Van Den Oord, A., et al., "WaveNet: A Generative Model For Raw Audio", arXiv:1609.03499v2, dated Sep. 19, 2016, 15 pages.

Wagenaar, M., et al., "Using Deep Convolutional Neural Networks to Predict Goal-scoring Opportunities in Soccer," International Conference on Pattern Recognition Applications and Methods, vol. 2, SCITEPRESS, 2017, 8 pages.

Wagenaar, M., "Predicting Goal-Scoring Opportunities in Soccer by Using Deep Convolutional Neural Networks," Department of Artificial Intelligence, University of Groningen, Nov. 16, 2016, 65 pages.

Walker, J., et al., "An Uncertain Future: Forecasting from Static Images using Variational Autoencoders", European Conference on Computer Vision, 2016, 17 pages.

Walters, Virgil Van Dijk Transfer May Not Fix Liverpool's Dismal Defending of Set-pieces Warns Jurgen Klopp After Watford Woe, https://www.mirror.co.uk/sport/football/news/liverpool-klopp-van-dijk-setpiece-10981217, Aug. 13, 2017, 21 pages.

Felsen, P., et al., "Where Will They Go? Predicting Fine-grained Adversarial Multi-agent Motion Using Conditional Variational Autoencoders," Proceedings of the European Conference on Computer Vision (ECCV), 2018, pp. 761-776.

Frey, B.J and Dueck, D. "Clustering by Passing Messages Between Data Points" Science Magazine, Feb. 15, 2007, 5 pages.

Goddard, J., "Modelling Football Match Results and the Efficiency of Fixed-odds Betting", Published 2004, 27 pages.

Graves, A., "Generating Sequences with Recurrent Neural Networks", arXiv:1308.0850v5, dated Jun. 5, 2014, 43 pages.

Gregor, K., et al., "DRAW: A Recurrent Neural Network For Image Generation", arXiv preprint arXiv:1502.04623, May 20, 2015, 10 pages.

Gyarmati, L., et al., "Searching for a Unique Style in Soccer," arXiv preprint arXiv:1409.0308, 2014, 4 pages.

Hinton, G.E., et al. "A Fast Learning Algorithm for Deep Belief Nets", Neural Comput, 18(7), 2006, pp. 1527-1554.

Ho, T.K "Random decision forests," Proceedings of 3rd International Conference on Document Analysis and Recognition, 1995, vol. 1 pp. 278-282. doi: 10.1109/ICDAR.1995.598994.

Huang, et al., "Graph Analysis of Major League Soccer Networks: CS224W Final Project," http://snap.stanford.edu/class/cs224w-2018/reports/CS224W-2018-46.pdf, Dec. 9, 2018, 9 pages.

Huang, K.Y and Chang, W.L "A Neural Network Method for Prediction of 2006 World Cup Football Game," IEEE, 2010, pp. 1-8.

Hubacek, O., et al., "Lifted Relational Team Embeddings for Predictive Sports Analytics," ILP Up-and-Coming/Short Papers, 2018, 7 pages.

Insafutdinov, E., et al., "ArtTrack: Articulated Multi-Person Tracking in the Wild", Proceedings of the IEEE Conference on Computer Vision and Pattern Recognition, 2017, 9 pages.

International Preliminary Report on Patentability for International Application No. PCT/US2016/066733, mailed Jun. 28, 2018 9 Pages.

International Preliminary Report on Patentability for International Application No. PCT/US2019/014608, mailed Jul. 30, 2020 10 Pages.

International Preliminary Report on Patentability for International Application No. PCT/US2019/014609, mailed Jul. 30, 2020, 08 Pages.

International Preliminary Report on Patentability for International Application No. PCT/US2019/014613, mailed Jul. 30, 2020, 07 Pages.

International Preliminary Report on Patentability for International Application No. PCT/US2019/014614, mailed Jul. 30, 2020, 6 Pages.

International Preliminary Report on Patentability for International Application No. PCT/US2020/020432, mailed Sep. 16, 2021, 10 Pages.

International Preliminary Report on Patentability for International Application No. PCT/US2020/032053, mailed Nov. 18, 2021, 08 Pages.

International Preliminary Report on Patentability for International Application No. PCT/US2021/016583, mailed Aug. 18, 2022, 11 Pages.

International Preliminary Report on Patentability for International Application No. PCT/US2021/034568, mailed Dec. 15, 2022, 8 Pages.

International Preliminary Report on Patentability for the Application No. PCT/US2021/053117, mailed Apr. 13, 2023, 8 pages.

International Search Report and Written Opinion for Application No. PCT/US2022/018709, mailed on Jun. 24, 2022, 11 pages.

International Search Report and Written Opinion for Application No. PCT/US2022/077383, mailed on Dec. 13, 2022, 18 pages.

International Search Report and Written Opinion for Application No. PCT/US2022/17229, mailed on Jun. 9, 2022, 9 pages.

International Search Report and Written Opinion for International Application No. PCT/US2020/020432, mailed May 28, 2020, 11 Pages.

International Search Report and Written Opinion for International Application No. PCT/US2020/032053, mailed Sep. 29, 2020, 09 Pages.

International Search Report and Written Opinion for PCT Application No. PCT/US2016/066733, dated Apr. 17, 2017, 11 pages.

International Search Report and Written Opinion for PCT Application No. PCT/US2019/014609, dated Apr. 12, 2019, 10 pages.

International Search Report and Written Opinion for PCT Application No. PCT/US2019/014613, dated Apr. 12, 2019, 9 Pages.

International Search Report and Written Opinion for PCT Application No. PCT/US2019/014614,, dated Apr. 16, 2019, 9 pages.

International Search Report and Written Opinion for PCT Application No. PCT/US2019/14608, dated Apr. 15, 2019, 12 pages.

International Search Report and Written Opinion for PCT Application No. PCT/US2021/34568, dated Aug. 25, 2021, 9 pages.

International Search Report and Written Opinion for PCT Application No. PCT/US2021/53117, dated Jan. 14, 2022, 9 pages.

International Search Report and Written Opinion for PCT Application No. PCT/US2022/15240, dated May 11, 2022, 7 pages.

International Search Report and Written Opinion for PCT Application No. PCT/US2022/76934, dated Dec. 13, 2022, 10 pages.

International Search Report and Written Opinion for PCT Application No. PCT/US21/16583, dated Apr. 23, 2021, 11 pages.

Jain, A., et al., "Recurrent Neural Networks for Driver Activity Anticipation via Sensory-Fusion Architecture", IEEE International Conference on Robotics and Automation (ICRA), 2016, 8 pages.

Janetzko, H., et al., "Feature-driven Visual Analytics of Soccer Data," IEEE Conference on Visual Analytics Science and (VAST), Nov. 2014, pp. 13-22.

Ji, B. and Li, J., NBA All-Star Lineup Prediction Based on Neural Networks. International Conference on Information Science & Cloud Computing Companion, Dec. 2013, pp. 864-869.

(56) References Cited

OTHER PUBLICATIONS

Kharrat, T., et al., "Plus-Minus Player Ratings for Soccer", arXiv:1706.04943v1, dated Jun. 16, 2017, 17 pages.

Kim, K., et al., "Motion Fields to Predict Play Evolution in Dynamic Sport Scenes", IEEE Computer Society Conference on Computer Vision and Pattern Recognition, 2010, 8 pages.

Kingma, D.P, and Lei Ba, J., "Adam: A Method for Stochastic Optimization", arXiv:1412.6980v9, ICLR 2015, dated Jan. 30, 2017, 15 Pages.

Kingma, D.P., et al., "Semi-supervised Learning with Deep Generative Models", Advances in Neural Information Processing Systems, Oct. 31, 2014, 9 Pages.

Kingman, D.P., et al., "Auto-Encoding Variational Bayes", arXiv preprint arXiv:1312.6114, May 1, 2014, 14 pages.

Kinoshita, K., et al., Deep Mixture Density Network for Statistical Model-based Feature Enhancement, 2017 IEEE International Conference on Acoustics, Speech and Signal Processing ICASSP), Mar. 2017, pp. 251-255.

Knauf, K., et al., "Spatio-temporal Convolution Kernels," Machine learning, vol. 102, Jul. 2015, 28 pages.

Koopman, S. J., and Lit, R., A Dynamic Bivariate Poisson Model for Analysing and Forecasting Match Results in the English Premier League. Journal of the Royal Statistical Society. Series a. Statistics in Society, 178(1), 167-186. https://doi.org/10.1111/rssa.12042.

Koren, Y., et al., "Matrix Factorization Techniques For Recommender Systems", Computer, IEEE Computer Society, Aug. 2009, 8 pages.

Le, H.M., et al., "Coordinated Multi-Agent Imitation Learning", Proceedings of the 34th International Conference on Machine Learning-Volume 70. JMLR. org, 2017, 13 pages.

\* cited by examiner

RECOMMENDATION ENGINE FOR COMBINING IMAGES AND GRAPHICS OF SPORTS CONTENT BASED ON ARTIFICIAL INTELLIGENCE GENERATED GAME METRICS

CROSS-REFERENCE TO RELATED APPLICATIONS

This patent application is a continuation of and claims the benefit of priority to U.S. application Ser. No. 17/937,156, filed on Sep. 30, 2022, which claims priority to U.S. Provisional Application No. 63/261,971, filed on Oct. 1, 2021, the entireties of each of which are incorporated herein by reference.

FIELD OF THE DISCLOSURE

The present disclosure generally relates to a recommendation engine for visualizations of sports content based on artificial intelligence generated game metrics.

BACKGROUND

With the proliferation of data, sports teams, commentators, and fans alike are more interested in identifying and classifying events that occur throughout a game or across a season. As companies develop models configured to generate various predictions and metrics, surfacing these predictions and metrics to the user becomes increasingly important.

SUMMARY

In some embodiments, a method is disclosed herein. A computing system receives data for a game. The data includes at least one of tracking data or event data. Based on the data for the game, the computing system determines that an event has occurred within the game. Based on the determining, the computing system generates a graphic responsive to the event. The graphic includes insights related to the event. The computing system recommends an image relevant to the event based on metatags associated with the event. The computing system generates a visual element by merging the image and the graphic. In some embodiments, the computing system may recommend an artificial intelligence (AI) metric or insight based on the event. Such recommendation may take the form of a single number, combination of numbers, or a visualization of the key play in terms of ball motion path (with or without the player tracking data) with the AI metric/insight.

In some embodiments, a non-transitory computer readable medium is disclosed herein. The non-transitory computer readable medium includes one or more sequences of instructions, which, when executed by one or more processors, causes a computing system to perform operations. The operations include receiving, by the computing system, data for a game, the data comprising at least one of tracking data or event data. The operations further include, based on the data for the game, determining, by the computing system, that an event has occurred within the game. The operations further include, based on the determining, generating, by the computing system, a graphic responsive to the event, wherein the graphic comprises insights related to the event. The operations further include recommending, by the computing system, an image relevant to the event based on metatags associated with the image. The operations further include generating, by the computing system, a visual element by merging the image with the graphic.

In some embodiments, a system is disclosed herein. The system includes a processor and a memory. The memory has programming instructions stored thereon, which, when executed by the processor, causes the system to perform operations. The operations include receiving data for a game, the data comprising at least one of tracking data or event data. The operations further include, based on the data for the game, determining that an event has occurred within the game. The operations further include, based on the determining, generating a graphic responsive to the event, wherein the graphic comprises insights related to the event. The operations further include recommending an image relevant to the event based on metatags associated with the image. The operations further include generating a visual element by merging the image with the graphic.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein are generally directed to the merging of different types of content into a single visual element. For example, one or more techniques described herein eliminate what used to be a time consuming and highly subjective process for one that is intelligent, objective, and automatic. The present system may utilize a combination of metatags and event analysis to recommend an image to be associated with a graphic capturing insights related to an artificial intelligence metric or event.

Figure 1:
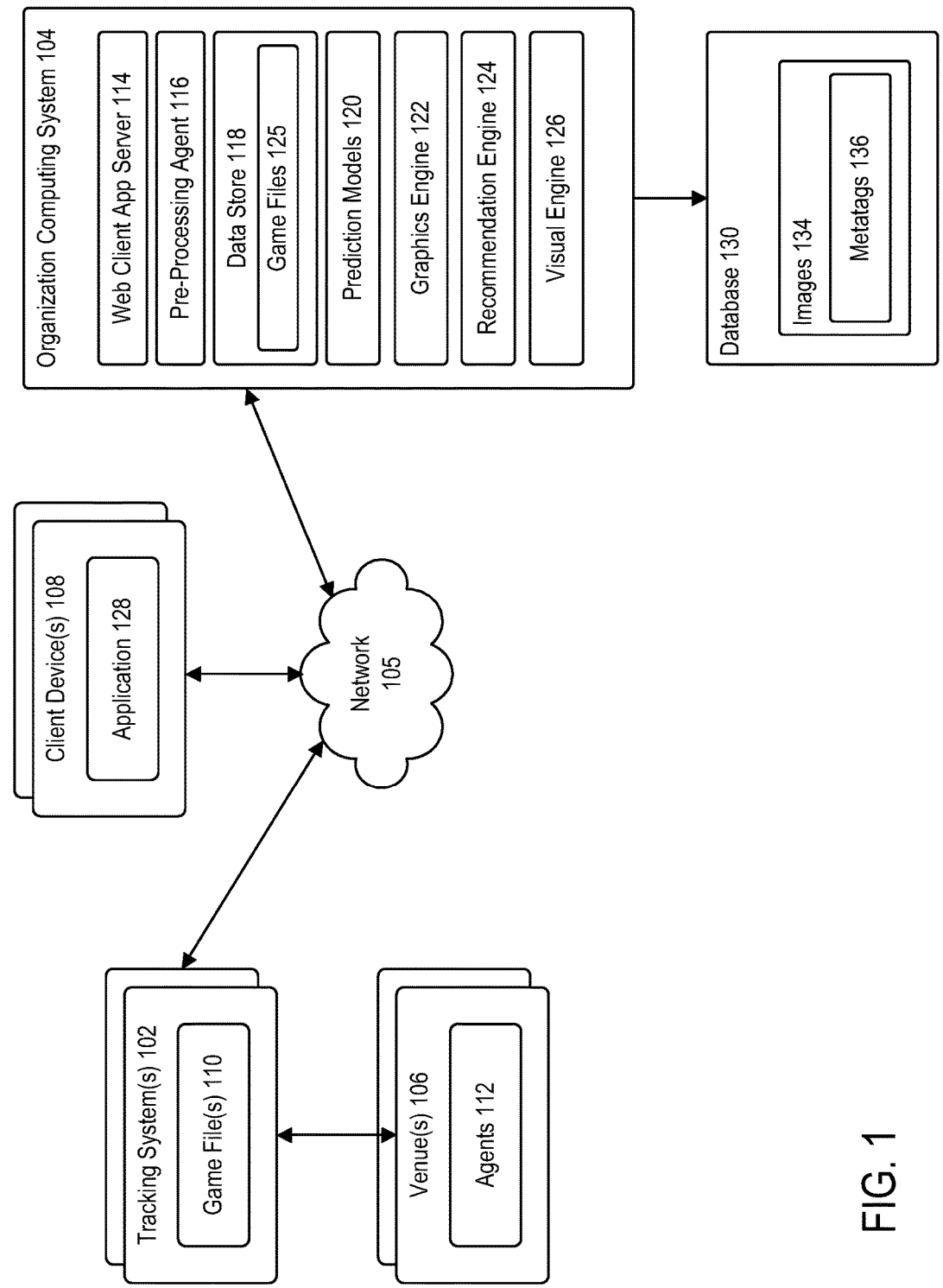
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to capture the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the court (e.g., high sideline view, free-throw line view, huddle view, face-off view, end zone view, etc.). In some embodiments, tracking system 102 may be used for a broadcast feed of a given match. In such embodiments, each frame of the broadcast feed may be stored in a game file 110.

In some embodiments, game file 110 may further be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. Organization computing system 104 may be configured to manage and analyze the data captured by tracking system 102. Organization computing system 104 may include at least a web client application server 114, a pre-processing agent 116, a data store 118, prediction models 120, graphics engine 122, recommendation engine 124, and visual engine 126.

Each of pre-processing agent 116, prediction models 120, graphics engine 122, recommendation engine 124, and visual engine 126 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 125. Each game file 125 may include video data of a given match. For example, the video data may correspond to a plurality of video frames captured by tracking system 102. In some embodiments, the video data may correspond to broadcast data of a given match, in which case, the video data may correspond to a plurality of video frames of the broadcast feed of a given match.

Pre-processing agent 116 may be configured to process data retrieved from data store 118. For example, pre-processing agent 116 may be configured to generate game files 125 stored in data store 118. For example, pre-processing agent 116 may be configured to generate a game file 125 based on data captured by tracking system 102. In some embodiments, pre-processing agent 116 may further be configured to store tracking data associated with each game in a respective game file 125. Tracking data may refer to the (x, y) coordinates of all players and balls on the playing surface during the game. In some embodiments, pre-processing agent 116 may receive tracking data directly from tracking system 102. In some embodiments, pre-processing agent 116 may derive tracking data from the broadcast feed of the game.

Prediction models 120 may be representative of one or more prediction models associated with STATS Perform, located in Chicago, Illinois. For example, prediction models 120 may be representative of one or more prediction models, such as, but not limited to, scoring prediction models, models that automatically detect events (e.g., in basketball—ball-screens, isolations, off-ball-screens, soccer: counter-attacks, set-plays), expected metrics (e.g., expected goals, expected possession and expected pass completion), player and team power rankings, player and team player prop predictions during the match or season simulation (both in terms of final table position as well as final player and team statistics at the end of the season), and the like.

In some embodiments, prediction models 120 may include prediction engines configured to accurately model defensive behavior and its effect on attacking behavior, such as that disclosed in U.S. application Ser. No. 17/649,970, which is hereby incorporated by reference in its entirety.

In some embodiments, prediction models 120 may include prediction models configured to accurately model or classify a team's playing style or a player's playing style, such as that disclosed in U.S. application Ser. No. 16/870,170, which is hereby incorporated by reference in its entirety.

In some embodiments, prediction models 120 may include prediction models configured to accurately model a team's offensive or defensive alignment, such as that disclosed in U.S. application Ser. No. 16/254,128, which is hereby incorporated by reference in its entirety.

In some embodiments, prediction models 120 may include prediction models configured to accurately model a team's formation, such as that disclosed in U.S. application Ser. No. 17/303,361, which is hereby incorporated by reference in its entirety.

In some embodiments, prediction models 120 may include prediction models configured to generate macro predictions and/or micro predictions in sports, such as that disclosed in U.S. application Ser. No. 17/651,960, which is hereby incorporated by reference in its entirety.

In some embodiments, prediction models 120 may include prediction models configured to accurately predict an outcome of an event or game, such as that disclosed in U.S. application Ser. No. 16/254,108, which is hereby incorporated by reference in its entirety.

In some embodiments, prediction models 120 may include prediction models configured to accurately predict an outcome of an event or game, such as that disclosed in U.S. application Ser. No. 16/254,088, which is hereby incorporated by reference in its entirety.

In some embodiments, prediction models 120 may include prediction models configured to accurately generate in-game insights, such as that disclosed in U.S. application Ser. No. 17/653,394, which is hereby incorporated by reference in its entirety.

In some embodiments, prediction models 120 may include prediction models configured to generate possible outcomes for an event (such as an at-bat in cricket), such as that disclosed in U.S. application Ser. No. 17/934,756, which is hereby incorporated by reference in its entirety.

Graphics engine 122 may be configured to generate one or more graphics that may include sports data and insights generated by prediction models 120. For example, graphics engine 122 may generate high-resolution player and team images, videos, GIFs, and the like that may be matched with real-time or near real-time sports data and insights. Graphics engine 122 may, generally, be representative of Opta Graphics, an intuitive multi-media graphics tool, commercially available from STATS Perform.

Recommendation engine 124 may be configured to recommend an image to include in a graphic generated by graphics engine 122. For example, based on an AI metric or event that triggered graphics engine 122 to generate a graphic capturing the AI metric or event, recommendation engine 124 may identify or recommend an image relevant to the AI metric or event. Conventionally, such process was a manual process, in which an administrator would need to select an image to be added to the graphic generated by graphics engine 122. Recommendation engine 124 eliminates this time-consuming and subjective process by utilizing a combination of metatags to identify an image relevant to the AI metric or event.

Recommendation engine 124 may communicate with database 130 to identify an image relevant to the graphic generated by graphics engine 122. As shown, database 130 may include images 134. Images 134 may be various sports-related images, such as, but not limited to, players, coaches, fans, plays, events, and the like. Each image 134 may include one or more metadata tags 136 associated therewith. As provided above, graphics engine 122 may generate a graphic associated with one or more artificial intelligence contextual features. These contextual features may be associated with various metadata tags 136. In this manner, recommendation engine 124 may select an image 134 that includes metadata tags 136 relevant to the artificial intelligence contextual features. In some embodiments the selected image may include a shot (expected goal), or a possession (expected possession), or a specific event (ball-screen in basketball or counter-attack/corner in soccer) or in terms of the predictions of performance for the match for a specific statistics, or end of season ranking.

In some embodiments, recommendation engine 124 may recommend a list of images (e.g., more than one image) for inclusion with the graphic generated by graphics engine 122. For example, a human operator may look through all the list of images recommended by recommendation engine 124. In comparison, the human operator may have to previously sift through a large database of images, many of which may not be relevant to an event trigger. In some embodiments, recommendation engine 124 may provide an insight as to why each image in the list of images is relevant.

Visual engine 126 may be configured to merge the recommended image with the generated graphic for presentation to the user. Such result may be referred to as a visual element. For example, a visual element may include a graphic generated by graphics engine 122 and a recommended image provided by recommendation engine 124.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 128. Application 128 may be representative of a web browser that allows access to a website or a stand-alone application. Client device 108 may access application 128 to access one or more functionalities of organization computing system 104. Client device 108 may communicate over network 105 to request a webpage, for example, from web client application server 114 of organization computing system 104. For example, client device 108 may be configured to execute application 128 to access one or more merged graphics generated by graphics engine 122. The content that is displayed to client device 108 may be transmitted from web client application server 114 to client device 108, and subsequently processed by application 128 for display through a graphical user interface (GUI) of client device 108.

Figure 2:
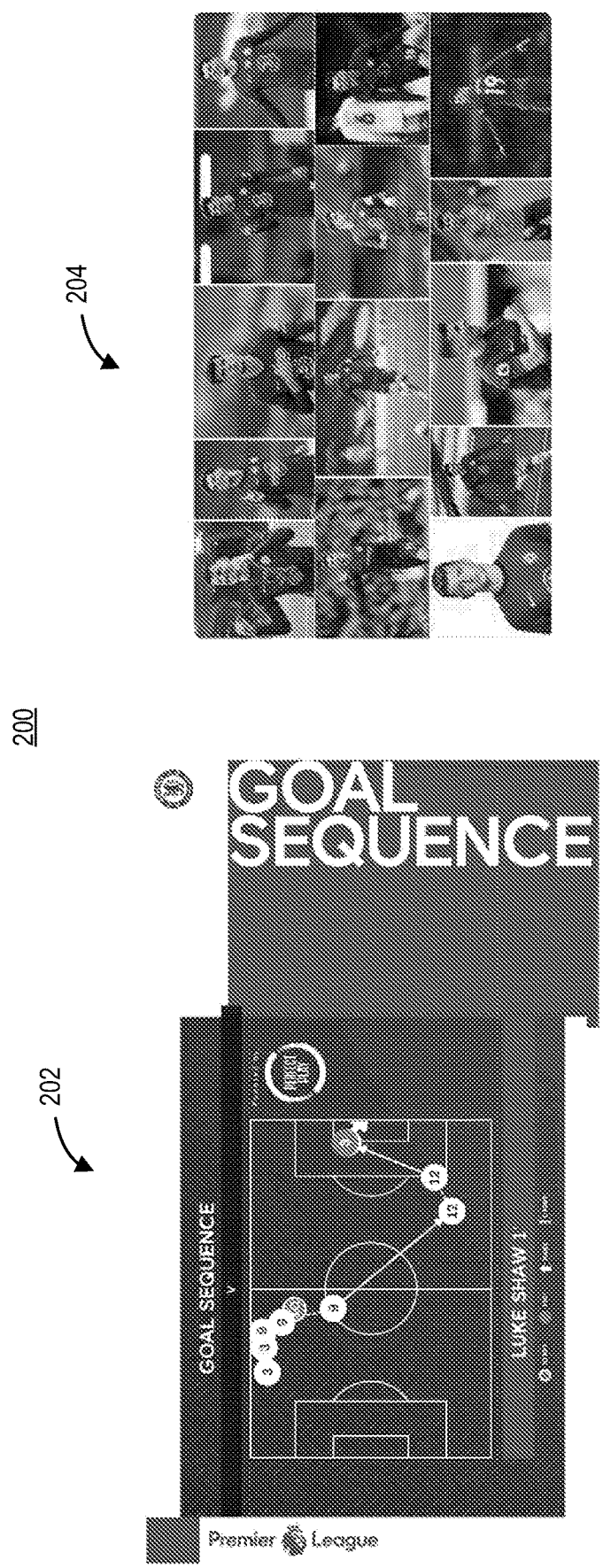
FIG. 2 illustrates an exemplary visual element, according to example embodiments.

FIG. 2 illustrates an exemplary visual element 200, according to example embodiments. Visual element 200 may include a graphic 202 and a recommended image 204. Graphic 202 may be a graphic generated by graphics engine 122. For example, as shown, graphic 202 may correspond to a graphic generated by graphics engine 122, responsive to a goal scored by Nashville SC. Based on this event, recommendation engine 124 may recommend recommended image 204. Recommended image 204 may be an image that includes an advanced metric, such as live win probability (as shown), expected goal value, expected possession value, a possession sequence visual, or the like. Such recommended image 204 may provide the end user with more context or insight into the event.

Figure 3:
FIG. 3 illustrates an exemplary visual element, according to example embodiments.
Figure 3:
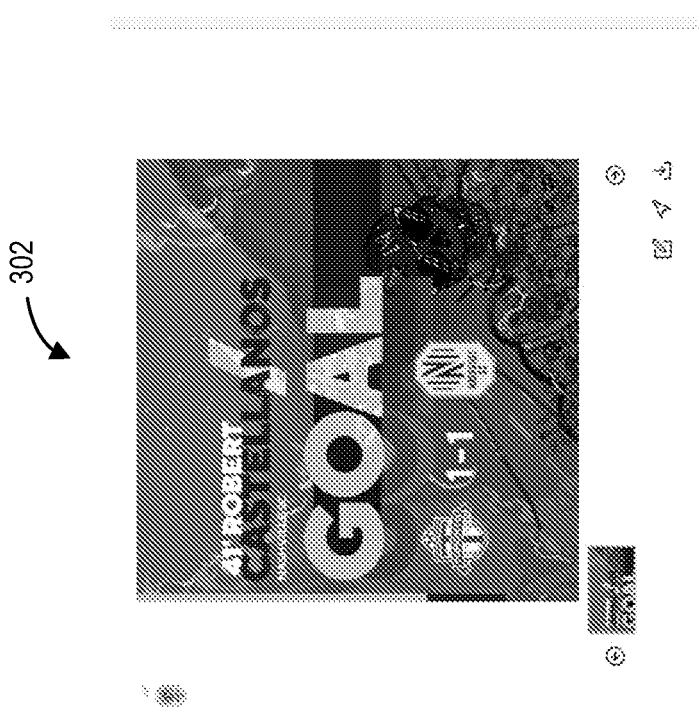

FIG. 3 illustrates an exemplary visual element 300, according to example embodiments. Visual element 300 may include a graphic 302 and a plurality of recommended images 304. Graphic 302 may be a graphic generated by graphics engine 122. For example, as shown, graphic 302 may correspond to a graphic generated by graphics engine 122, responsive to a goal being scored. Here, graphic 302 may illustrate a goal sequences corresponding to the goal. Based on this event, recommendation engine 124 may recommend recommended image 204. As shown, there may be several recommended images 304 that may be relevant to the event. For example, recommended images 304 may include, but are not limited to, images of the players that scored the goal, images of the player at night (if the game is at night), images of the player during the day (if the game is during the day), images of the player celebrating, images of the player in a specific jersey (home jersey, away jersey, alternate jersey), and the like. Based on the recommended images 304, recommendation engine 124 may select an image for inclusion in visual element 300. Such recommended image of the plurality of recommended images 304 may be provided to the end user.

Figure 4:
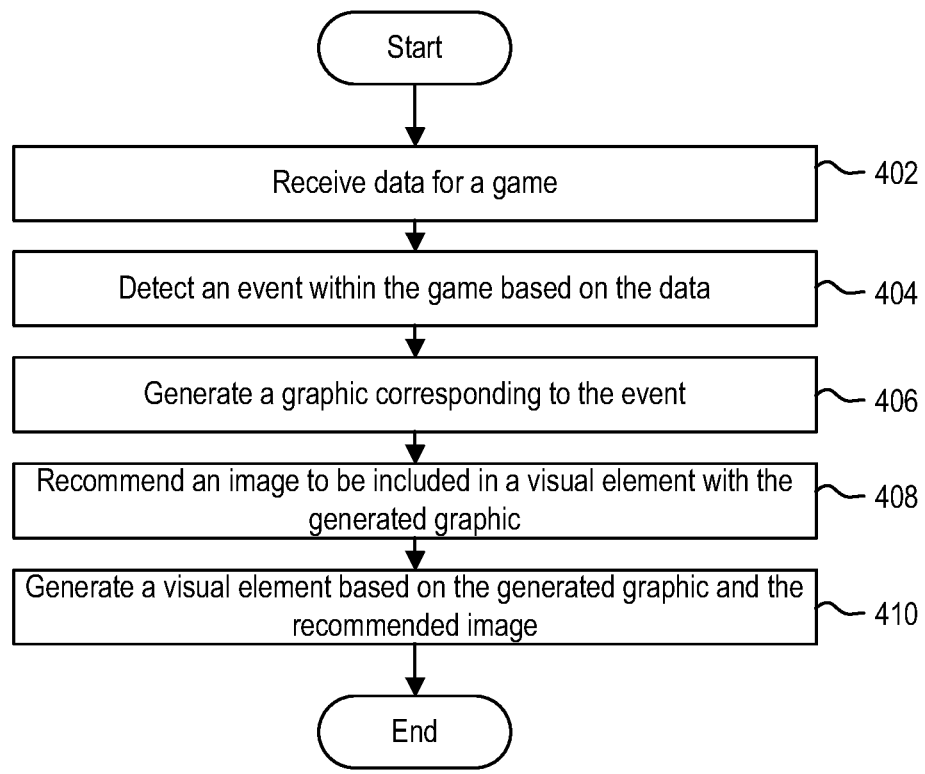
FIG. 4 is a flow diagram illustrating a method of generating a visual element, according to example embodiments.

FIG. 4 is a flow diagram illustrating a method 400 of generating a visual element, according to example embodiments. Method 400 may begin at step 402.

At step 402, organization computing system 104 may receive data for a game. In some embodiments, the data may include tracking data for the game. In some embodiments, tracking data may be received from tracking system 102. In some embodiments, tracking data may be derived from a broadcast video stream of the game. In some embodiments, the data may include event data for the game. In some embodiments, prediction models 120 and/or pre-processing agent 116 may generate or derive the event data from the tracking data and/or broadcast data. In some embodiments, event data may be received from tracking system 102.

At step 404, organization computing system 104 may detect an event within the game based on the data. In some embodiments, pre-processing agent 116 may detect an event within the data by analyzing tracking data and/or event data. In some embodiments, prediction models 120 may detect an event within the data utilizing one or more machine learning algorithms. An event may refer to a goal, a pass, a record breaking event, and the like.

At step 406, organization computing system 104 may generate a graphic corresponding to the event. For example, responsive to detecting an event within the game, graphics engine 122 may be configured to generate one or more graphics that may include sports data and insights, generated by prediction models 120, that may be related to the event. For example, graphics engine 122 may generate a high-resolution images, videos, GIFs, or the like that may be matched with real-time or near real-time sports data and insights related to the event. Graphics engine 122 may, generally, be representative of Opta Graphics, an intuitive multi-media graphics tool, commercially available from STATS Perform.

At step 408, organization computing system 104 may recommend an image to be included in a visual element with the generated graphic. For example, recommendation engine 124 may recommend an image to include in a visual element with the graphic generated by graphics engine 122. For example, based on an AI metric or event that triggered graphics engine 122 to generate a graphic capturing the AI metric or event, recommendation engine 124 may identify or recommend an image relevant to the AI metric or event. To identify the recommended image, recommendation engine 124 may leverage metatags in database 130 of images 134 to identify an image relevant to the AI metric or event.

In some embodiments, organization computing system 104 may further recommend an AI metric or insight based on the event. For example, recommendation engine 124 may recommend an AI metric or insight to be included in the visual element.

At step 410, organization computing system 104 may generate a visual element based on the graphic generated by graphics engine 122 and the recommended image selected by recommendation engine 124. For example, visual engine 126 may merge the recommended image with the graphic generated by graphics engine 122 to generate the visual element.

Figure 5A:
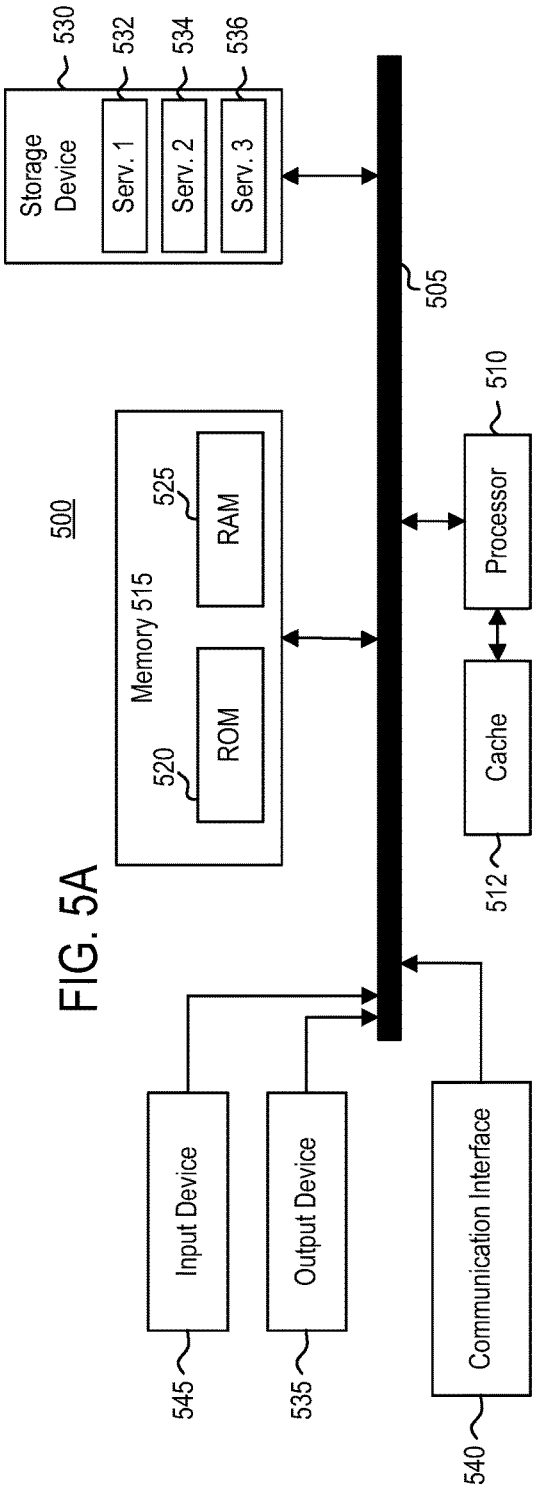
FIG. 5A is a block diagram illustrating a computing device, according to example embodiments.

FIG. 5A illustrates an architecture of computing system 500, according to example embodiments. System 500 may be representative of at least a portion of organization computing system 104. One or more components of system 500 may be in electrical communication with each other using a bus 505. System 500 may include a processing unit (CPU or processor) 510 and a system bus 505 that couples various system components including the system memory 515, such as read only memory (ROM) 520 and random access memory (RAM) 525, to processor 510. System 500 may include a cache of high-speed memory connected directly with, in close proximity to, or integrated as part of processor 510. System 500 may copy data from memory 515 and/or storage device 530 to cache 512 for quick access by processor 510. In this way, cache 512 may provide a performance boost that avoids processor 510 delays while waiting for data. These and other modules may control or be configured to control processor 510 to perform various actions. Other system memory 515 may be available for use as well. Memory 515 may include multiple different types of memory with different performance characteristics. Processor 510 may include any general purpose processor and a hardware module or software module, such as service 1 532, service 2 534, and service 3 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the computing system 500, an input device 545 may represent any number of input mechanisms, such as a microphone for speech, a touch-sensitive screen for gesture or graphical input, keyboard, mouse, motion input, speech and so forth. An output device 535 (e.g., display) may also be one or more of a number of output mechanisms known to those of skill in the art. In some instances, multimodal systems may enable a user to provide multiple types of input to communicate with computing system 500. Communications interface 540 may generally govern and manage the user input and system output. There is no restriction on operating on any particular hardware arrangement and therefore the basic features here may easily be substituted for improved hardware or firmware arrangements as they are developed.

Storage device 530 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 may include services 532, 534, and 536 for controlling the processor 510. Other hardware or software modules are contemplated. Storage device 530 may be connected to system bus 505. In one aspect, a hardware module that performs a particular function may include the software component stored in a computer-readable medium in connection with the necessary hardware components, such as processor 510, bus 505, output device 535, and so forth, to carry out the function.

Figure 5B:
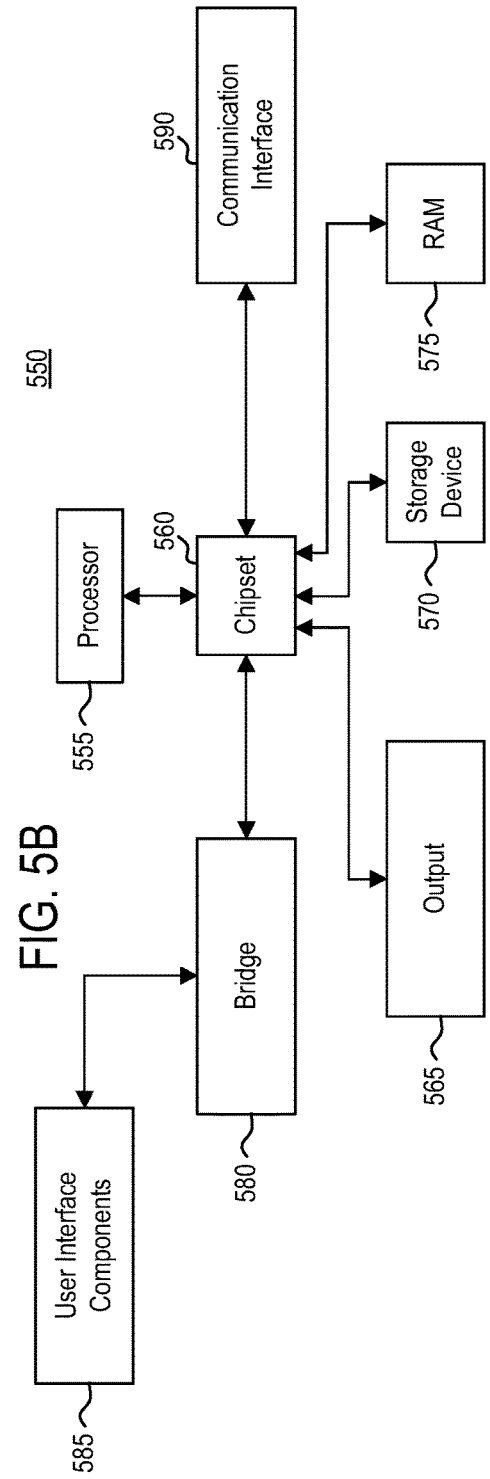
FIG. 5B is a block diagram illustrating a computing device, according to example embodiments.

FIG. 5B illustrates a computer system 550 having a chipset architecture that may represent at least a portion of organization computing system 104. Computer system 550 may be an example of computer hardware, software, and firmware that may be used to implement the disclosed technology. System 550 may include a processor 555, representative of any number of physically and/or logically distinct resources capable of executing software, firmware, and hardware configured to perform identified computations. Processor 555 may communicate with a chipset 560 that may control input to and output from processor 555. In this example, chipset 560 outputs information to output 565, such as a display, and may read and write information to storage device 570, which may include magnetic media, and solid-state media, for example. Chipset 560 may also read data from and write data to RAM 575. A bridge 580 for interfacing with a variety of user interface components 585 may be provided for interfacing with chipset 560. Such user interface components 585 may include a keyboard, a microphone, touch detection and processing circuitry, a pointing device, such as a mouse, and so on. In general, inputs to system 550 may come from any of a variety of sources, machine generated and/or human generated.

Chipset 560 may also interface with one or more communication interfaces 590 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 555 analyzing data stored in storage device 570 or RAM 575. Further, the machine may receive inputs from a user through user interface components 585 and execute appropriate functions, such as browsing functions by interpreting these inputs using processor 555.

It may be appreciated that example systems 500 and 550 may have more than one processor 510 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method comprising:
receiving, by a computing system, video data for a game;
determining, by the computing system, tracking data based on the video data;
determining, by the computing system and using a prediction model, an artificial intelligence metric based on the tracking data;
generating, by the computing system, a graphic responsive to determining the artificial intelligence metric, wherein the graphic comprises the artificial intelligence metric and one or more artificial intelligence contextual features associated with a plurality of metadata tags;
recommending, by the computing system, an image including at least one metadata tag of the plurality of metadata tags responsive to generating the graphic; and
generating, by the computing system, a visual element by merging the image with the graphic.

2. The method of claim 1, further comprising:
recommending, by the computing system and using the prediction model, an insight to be included in the visual element.

3. The method of claim 2, wherein the insight includes a prediction of an outcome of the game.

4. The method of claim 1, wherein the artificial intelligence metric is a single number or a combination of numbers.

5. The method of claim 1, wherein recommending, by the computing system, the image including at least one metadata tag of the plurality of metadata tags, comprises:
generating a list of a plurality of images, wherein each image of the plurality of images includes at least one metadata tag of the plurality of metadata tags; and
selecting the recommended image from the plurality of images.

6. The method of claim 1, wherein the recommended image includes a probability of a win, an expected goal value, an expected possession value, or a visual of a possession sequence.

7. The method of claim 1, further comprising:
generating, by the computing system and using the prediction model, insights related to the artificial intelligence metric.

8. A non-transitory computer readable medium comprising instructions that, when executed by one or more processors, cause a computing system to:
receive, by the computing system, video data for a game;
determine, by the computing system, tracking data based on the video data;
determine, by the computing system and using a prediction model, an artificial intelligence metric based on the tracking data;
generate, by the computing system, a graphic responsive to determining the artificial intelligence metric, wherein the graphic comprises the artificial intelligence metric and one or more artificial intelligence contextual features associated with a plurality of metadata tags;
recommend, by the computing system, an image including at least one metadata tag of the plurality of metadata tags responsive to generating the graphic; and
generate, by the computing system, a visual element by merging the image with the graphic.

9. The non-transitory computer readable medium of claim 8, wherein execution of the instructions further causes the computing system to:

recommend, by the computing system and using the prediction model, an insight to be included in the visual element.

10. The non-transitory computer readable medium of claim 9, wherein the insight includes a prediction of an outcome of the game.

11. The non-transitory computer readable medium of claim 8, wherein the artificial intelligence metric is a single number or a combination of numbers.

12. The non-transitory computer readable medium of claim 8, wherein recommending, by the computing system, the image including at least one metadata tag of the plurality of metadata tags, comprises:

generating a list of a plurality of images, wherein each image of the plurality of images includes at least one metadata tag of the plurality of metadata tags; and selecting the recommended image from the plurality of images.

13. The non-transitory computer readable medium of claim 8, wherein the recommended image includes a probability of a win, an expected goal value, an expected possession value, or a visual of a possession sequence.

14. The non-transitory computer readable medium of claim 8, wherein execution of the instructions further causes the computing system to:

generate, by the computing system and using the prediction model, insights related to the artificial intelligence metric.

15. A system, comprising:

a processor; and a memory having programming instructions stored thereon, which, when executed by the processor, causes the system to perform operations comprising:

receiving video data for a game;

determining tracking data based on the video data;

determining, using a prediction model, an artificial intelligence metric based on the tracking data;

generating, a graphic responsive to determining the artificial intelligence metric, wherein the graphic comprises the artificial intelligence metric and one or more artificial intelligence contextual features associated with a plurality of metadata tags;

recommending an image including at least one metadata tag of the plurality of metadata tags responsive to generating the graphic; and generating a visual element by merging the image with the graphic.

16. The system of claim 15, wherein the operations further comprise:

recommending, using the prediction model, an insight to be included in the visual element.

17. The system of claim 16, wherein the insight includes a prediction of an outcome of the game.

18. The system of claim 15, wherein recommending the image including at least one metadata tag of the plurality of metadata tags, comprises:

generating a list of a plurality of images, wherein each image of the plurality of images includes at least one metadata tag of the plurality of metadata tags; and selecting the recommended image from the plurality of images.

19. The system of claim 15, wherein the recommended image includes a probability of a win, an expected goal value, an expected possession value, or a visual of a possession sequence.

20. The system of claim 15, wherein the operations further comprise:

generating, using the prediction model, insights related to the artificial intelligence metric.

\* \* \* \* \*